US009017810B2

(12) United States Patent
Eder et al.

(10) Patent No.: US 9,017,810 B2
(45) Date of Patent: Apr. 28, 2015

(54) METHOD FOR PRODUCING A POROUS PARTICLE COMPOSITE FOR AN ELECTRICAL INSULATING PAPER

(75) Inventors: Florian Eder, Erlangen (DE); Peter Gröppel, Erlangen (DE); Vicky Grübel, Fürth (DE); Steffen Lang, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/114,953

(22) PCT Filed: Apr. 11, 2012

(86) PCT No.: PCT/EP2012/056563
§ 371 (c)(1),
(2), (4) Date: Oct. 31, 2013

(87) PCT Pub. No.: WO2012/150110
PCT Pub. Date: Nov. 8, 2012

(65) Prior Publication Data
US 2014/0060386 A1    Mar. 6, 2014

(30) Foreign Application Priority Data
May 5, 2011  (EP) .................................. 11164882

(51) Int. Cl.
*B32B 5/16* (2006.01)
*B32B 27/14* (2006.01)
*C04B 14/30* (2006.01)
*H01B 3/18* (2006.01)
*C09C 1/40* (2006.01)
*C09C 3/12* (2006.01)
*D21H 13/36* (2006.01)
*D21H 15/02* (2006.01)
*H01B 3/10* (2006.01)
*H01B 3/44* (2006.01)
*H01B 3/46* (2006.01)
*D21H 21/14* (2006.01)

(52) U.S. Cl.
CPC .............. *H01B 3/18* (2013.01); *C01P 2004/22* (2013.01); *C09C 1/407* (2013.01); *C09C 3/12* (2013.01); *D21H 13/36* (2013.01); *D21H 15/02* (2013.01); *D21H 21/14* (2013.01); *H01B 3/10* (2013.01); *H01B 3/44* (2013.01); *H01B 3/46* (2013.01); *C01P 2004/20* (2013.01)

(58) Field of Classification Search
USPC ........... 156/53; 106/409; 428/304.4, 328, 323
See application file for complete search history.

(56) References Cited

U.S. PATENT DOCUMENTS

| 4,578,308 | A | 3/1986 | Hani | |
|---|---|---|---|---|
| 2005/0016658 | A1* | 1/2005 | Asokan et al. | ................... 156/53 |
| 2006/0034879 | A1 | 2/2006 | Akeda | |
| 2007/0141324 | A1* | 6/2007 | Stevens et al. | ................ 428/324 |
| 2008/0050580 | A1* | 2/2008 | Stevens et al. | ................ 428/327 |

FOREIGN PATENT DOCUMENTS

| CN | 1216852 A | 5/1999 |
|---|---|---|
| CN | 1407030 A | 4/2003 |
| CN | 1681892 A | 10/2005 |
| CN | 101268015 A | 9/2008 |
| CN | 101323715 A | 12/2008 |
| CN | 101423669 A | 5/2009 |
| CN | 101928452 A | 12/2010 |
| DE | 1590341 A1 | 6/1970 |
| DE | 10243438 A1 | 3/2004 |
| EP | 0623936 A1 | 11/1994 |
| JP | 2000149689 A | 5/2000 |
| JP | 2005089648 A | 4/2005 |
| KR | 20050076891 A | 7/2005 |
| WO | WO 2005056696 A2 | 6/2005 |

* cited by examiner

Primary Examiner — Kara Boyle

(57) ABSTRACT

A method is provided for producing an electrical insulation paper having a particle composite. The method involves mixing a dispersion of particles in platelet form, a carrier fluid and a functionalizing agent which is distributed in the carrier fluid and has a proportion by mass in the dispersion corresponding to a predetermined mass ratio based on the proportion by mass of the particles. The dispersion is sedimented, such that the particles in platelet form are arranged in essentially plane-parallel layers in the sediment. The carrier fluid is removed from the sediment. Energy is introduced into the sediment to overcome the activation energy of that chemical reaction of the functionalizing agent with the particles which forms the particle composite from the sediment with coupling of the particles via the functionalizing agent. The mass ratio is predetermined such that the particle composite has a porous structure. The insulation paper is thereby produced.

20 Claims, 1 Drawing Sheet

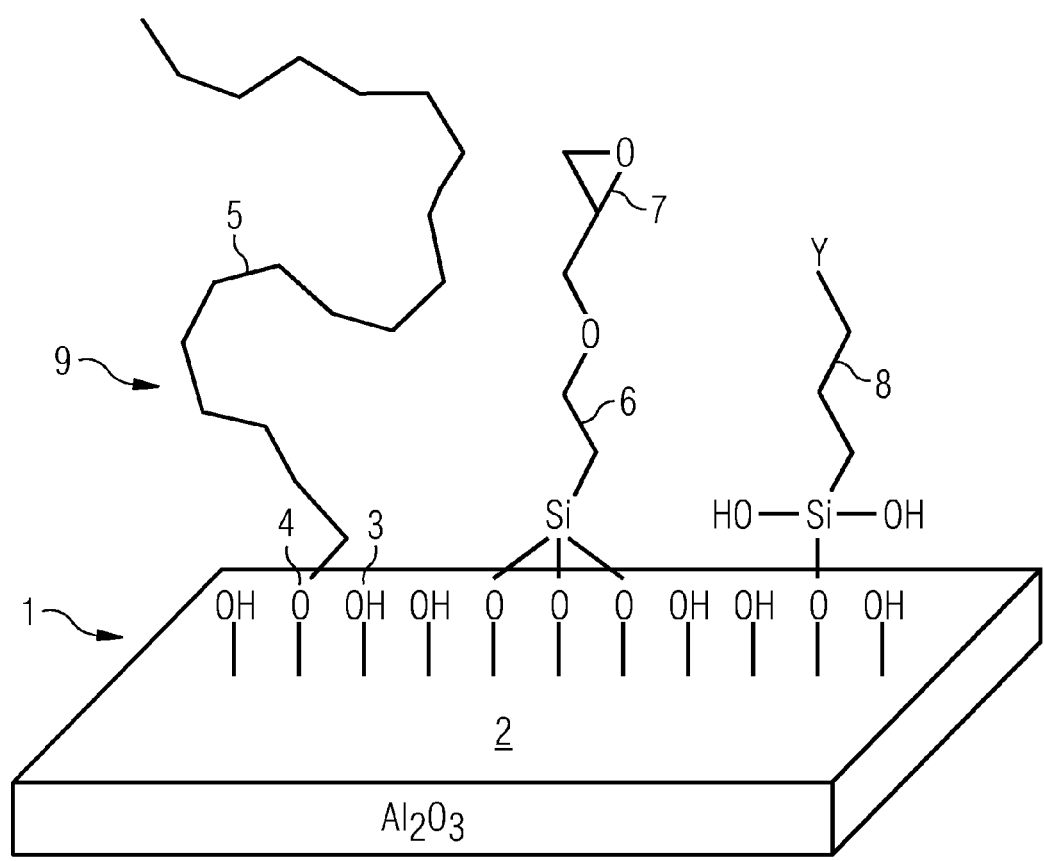

METHOD FOR PRODUCING A POROUS PARTICLE COMPOSITE FOR AN ELECTRICAL INSULATING PAPER

CROSS REFERENCE TO RELATED APPLICATIONS

This application is the US National Stage of International Application No. PCT/EP2012/056563, filed Apr. 11, 2012 and claims the benefit thereof. The International Application claims the benefits of European application No. 11164882.0 EP filed May 5, 2011. All of the applications are incorporated by reference herein in their entirety.

FIELD OF INVENTION

The invention relates to a process for producing a porous particulate composite for an electrical insulation paper.

BACKGROUND OF INVENTION

Electrical machines, for example motors and generators, have electrical conductors, an electrical insulation and a laminated stator core. The insulation has the purpose of electrically insulating the conductors from one another, from the laminated stator core and from the environment. In the event of mechanical or thermal stress in the course of operation of the machine, cavities may form at the interfaces between the insulation and the conductor or between the insulation and the laminated stator core, in which sparks can form as a result of partial electrical discharges. The sparks can result in formation of "treeing" channels in the insulation. As a result of the "treeing" channels, there may be an electrical sparkover through the insulation. A barrier against the partial discharges is achieved through the use of mica in the insulation, this having a high partial discharge resistance. The mica is used in the form of mica particles in platelet form with a conventional particle size of several hundreds of micrometers up to several millimeters, the mica particles being processed to give a mica paper.

In the course of production of mica paper, the mica particles in platelet form are arranged in layers, such that the particles are arranged substantially parallel to one another, with overlapping of immediately superposed mica particles to form contact surfaces. Between the contact surfaces, as a result of van der Waals forces and hydrogen bonds, interactions form, which give the mica paper a high mechanical durability and hence a stable form.

In the production of the insulation, the mica paper is wound around the conductor to be insulated and impregnated with a resin. Subsequently the composite composed of the resin and the mica paper is hardened. In addition, the mica paper may be applied to a carrier fabric composed of glass or polyester, in which case the carrier fabric imparts additional stability to the mica paper. An adhesive bonds the carrier fabric and the mica paper to a mica tape. To avoid high temperatures in the conductor in the course of operation of the machine, heat has to be removed from the conductor to the environment. The thermal conductivity of the mica paper is only about 0.2 to 0.25 W/mK at room temperature, as a result of which the dissipation of heat from the electrical conductor is limited.

An improvement in the conduction of heat could be achieved either through a decrease in the thickness of the insulation or through improved thermal conductivity of the insulation. The use of aluminum oxide particles in platelet form rather than the mica particles in platelet form is known, aluminum oxide having a much higher thermal conductivity at about 25 to 40 W/mK than mica.

In the case of use of the aluminum oxide particles in platelet form, however, the disadvantage arises that the particle size is conventionally below 100 micrometers, as a result of which the resultant contact surfaces of adjacent aluminum oxide particles are so small that the interactions thereof to form a particle composite are only weak. This is accompanied by a low strength of this particle composite, as a result of which the production of the insulation paper from the aluminum oxide particles is difficult.

WO 2005/056696 A2 and DE 102 43 438 A1 describe pigments which have been surface-modified by colorants and have been coated by one or more layers of polymer. DE 1 590 341 A1 describes a mica insulating body having a binder composed of a silicone resin to which a silica-alumina ester has been added. DE 1 590 341 A1 describes a mica insulating body having a binder composed of a silicone resin to which a silica-alumina ester has been added. The thermally stable electrical insulating material according to EP 0 623 936 A1 comprises melamine resin fibers, polymer fibrils, and optionally synthetic resin powders and mineral fillers. U.S. Pat. No. 4,578,308 discloses a "prepreg sheet" comprising a mixture of alumina fibers as the main component, organic microfibers and a heat-curable resin.

SUMMARY OF INVENTION

It is an object of the invention to provide a process for producing a particle composite for an electrical insulation paper, wherein the particle composite has a strength sufficient for production of the insulation paper.

The process according to the invention for production of an electrical insulation paper comprising a porous particle composite has the following steps: mixing a dispersion of particles in platelet form, a carrier fluid and a functionalizing agent which is distributed in the carrier fluid and has a proportion by mass in the dispersion corresponding to a predetermined mass ratio based on the proportion by mass of the particles; producing a sediment by sedimenting the dispersion, as a result of which the particles in platelet form are arranged in essentially plane-parallel layers in the sediment; removing the carrier fluid from the sediment; introducing energy into the sediment to overcome the activation energy of that chemical reaction of the functionalizing agent with the particles which forms the particle composite from the sediment with coupling of the particles via the functionalizing agent, wherein the mass ratio is predetermined such that the particle composite has a porous structure; producing the insulation paper. The coupling of the particles formed in such a way enhances the interactions of the particles with one another, such that the particle composite advantageously has sufficient strength for paper production.

The carrier fluid is preferably a solvent in which the functionalizing agent is soluble, the functionalizing agent having been dissolved in the solvent. The functionalizing agent is preferably selected such that it forms an essentially monomolecular thin layer on the surface of the particles. The chemical reaction for coupling of the particles proceeds between the thin layers.

Before the mixing of the dispersion, the particles are preferably formed with an essentially monomolecular thin layer on the surface of the particles, the thin layer being produced from a further functionalizing agent. The chemical reaction for coupling of the particles proceeds between the thin layer and the functionalizing agent.

In a preferred alternative, particles are added to the dispersion of the particles having the essentially monomolecular thin layer and the carrier fluid, these particles having an essentially monomolecular thin layer different than the thin layer of the particles originally present in the dispersion. The chemical reaction for coupling of the particles proceeds between two or more different thin layers.

The particles are preferably selected such that they comprise aluminum oxide. One advantage of the aluminum oxide is the high thermal conductivity thereof compared to mica.

The functionalizing agent is preferably selected such that it is a polymer, especially a thermoplastic. The polymer is preferably selected such that it is a polyolefin alcohol, especially polyethylene glycol, or an incompletely hydrolyzed polyvinyl alcohol having a molecular mass between 1000 and 4000, or a polyalkylsiloxane, especially methoxy-terminated polydimethylsiloxane, or a silicone polyester. In addition, the functionalizing agent is preferably selected such that it is an alkoxysilane and forms an essentially monomolecular thin layer on the particle surface. The alkoxysilane is preferably selected such that it has epoxy groups, especially 3-glycidoxypropyltrimethoxysilane, or amino groups, especially 3-aminopropyltriethoxysilane. In addition, the functionalizing agent is preferably selected such that it has particles, especially nanoparticles, of silicon dioxide bearing surface epoxy functionalities.

The process according to the invention is preferably performed such that the energy for overcoming the activation energy is supplied to the sediment in the form of heat and/or radiation. In addition, the process according to the invention is preferably performed such that the carrier fluid is removed through filtration and subsequent supply of heat. The removal of the solvent through supply of heat and the supply of heat for overcoming the activation energy can advantageously be effected in one process step. In this context, the carrier fluid is preferably selected such that it is water.

BRIEF DESCRIPTION OF THE DRAWINGS

The invention is illustrated in detail hereinafter with reference to the schematic drawing appended. The FIGURE shows a perspective view of a particle of a particle composite produced in accordance with the invention.

DETAILED DESCRIPTION OF INVENTION

As is clear from the FIGURE, an aluminum oxide particle 1 in platelet form has a particle surface 2. Provided on the particle surface 2 are hydroxyl groups 3 and bonded oxygen atoms 4. By way of example, three different groups bonded to the particle surface 2 are shown: an alkyl group 5 bonded via an oxygen atom 4, a silyl group 6 bonded via three oxygen atoms 4 and having an epoxy group 7, and a dihydroxysilyl group bonded via an oxygen atom and having a variable Y radical. The groups from an essentially monomolecular thin layer 9 on the particle surface 2.

With reference to three examples, the process according to the invention is illustrated in detail hereinafter.

A dispersion of aluminum oxide particles 1 in platelet form, water and the 3-glycidoxypropyltrimethoxysilane functionalizing agent is prepared. 3-Glycidoxypropyltrimethoxysilane forms, in a condensation reaction at the surface of the aluminum oxide particles 2, an essentially monomolecular thin layer 9 having a silyl group 6 which is bonded via three oxygen atoms 4 and has epoxide groups 7. Once the thin layer 9 has formed, the polyethylene glycol polymer is added to the dispersion and dissolves in the water solvent. The dispersion is sedimented, as a result of which the aluminum oxide particles 1 in platelet form are aligned in plane-parallel layers. The sediment formed is filtered off with suction and dried in an oven. The amount of heat utilized for drying is selected such that it is sufficient to overcome the activation energy of that chemical reaction which forms the particle composite with coupling of the aluminum oxide particles 1 to one another. The chemical reaction takes place between the surface epoxy groups 7 and the hydroxyl groups of the polyethylene glycol. The mass ratio of the functionalizing agent based on the mass of the particles was selected such that the particle composite has a porous structure.

A dispersion is prepared from aluminum oxide particles 1 in platelet form, water and the 3-glycidoxypropyltrimethoxysilane functionalizing agent. 3-Glycidoxypropyltrimethoxysilane forms, in a condensation reaction at the surface of the aluminum oxide particles 2, an essentially monomolecular thin layer 9 having a silyl group 6 which is bonded via three oxygen atoms 4 and has epoxy groups 7. Once the thin layer has formed, aluminum oxide particles 1 in platelet form, the surface of which has already been provided with a second thin layer 9, is added to the dispersion. This second thin layer 9 was prepared with the 3-aminopropyltriethoxysilane functionalizing agent and has a silyl radical which is bonded via three oxygen atoms and has one amino group. The dispersion is sedimented, as a result of which the aluminum oxide particles 1 in platelet form are aligned in plane-parallel layers. The sediment formed is filtered off with suction and dried in an oven. The amount of heat utilized for drying is selected such that it is sufficient to overcome the activation energy of that chemical reaction which forms the particle composite with coupling of the aluminum oxide particles 1 to one another. The chemical reaction takes place between the surface epoxy groups 7 of the particles having the first thin layer 9 and the surface amino groups of the particles having the second thin layer 9. The mass ratio of the functionalizing agent based on the mass of the particles was selected such that the particle composite has a porous structure.

A dispersion is prepared from aluminum oxide particles 1 in platelet form, water and a functionalizing agent comprising nanoscale silicon oxide particles. The nanoscale silicon oxide particles have surface silyl groups having epoxy groups. The dispersion is sedimented, as a result of which the aluminum oxide particles 1 in platelet form are aligned in plane-parallel layers. The sediment formed is filtered off with suction and dried in an oven. The amount of heat utilized for drying is selected such that it is sufficient to overcome the activation energy of that chemical reaction which forms the particle composite with coupling of the aluminum oxide particles 1 to one another. The chemical reaction takes place between the surface epoxy groups of the silicon particles and the hydroxyl groups 3 of the aluminum oxide particles 1. The mass ratio of the functionalizing agent based on the mass of the particles was selected such that the particle composite has a porous structure.

The invention claimed is:

1. A method for producing an electrical insulation paper comprising a particle composite, comprising the steps of:
    mixing a dispersion of particles in platelet form, a carrier fluid and a functionalizing agent which is distributed in the carrier fluid and has a proportion by mass in the dispersion corresponding to a predetermined mass ratio based on the proportion by mass of the particles,
    producing a sediment by sedimenting the dispersion, as a result of which the particles in platelet form are arranged in essentially plane-parallel layers in the sediment;
    removing the carrier fluid from the sediment, introducing energy into the sediment to overcome the activation energy of that chemical reaction of the functionalizing agent with the particles which forms the particle composite from the sediment with coupling of the particles via the functionalizing agent, wherein the mass ratio is predetermined such that the particle composite has a porous structure, producing the insulation paper.

2. The method as claimed in claim 1, wherein the carrier fluid is a solvent in which the functionalizing agent is soluble, wherein the functionalizing agent has been dissolved in the solvent.

3. The method as claimed in claim 2, wherein the functionalizing agent is selected such that, when the dispersion is mixed, the functionalizing agent forms an essentially monomolecular thin layer on the surface of the particles.

4. The method as claimed in claim 2, further comprising:
prior to the mixing of the dispersion, the particles are formed with an essentially monomolecular thin layer on the surface of the particles,
wherein the thin layer is produced from a further functionalizing agent, such that the chemical reaction for coupling of the particles takes place between the thin layer and the functionalizing agent.

5. The method as claimed in claim 3, further comprising:
further mixing of the dispersion,
wherein formation of the monomolecular thin layer is followed by mixing of additional particles into the dispersion, these having an essentially monomolecular thin layer, such that the chemical reaction for coupling of the particles takes place between the thin layers.

6. The method as claimed in claim 4, further comprising:
further mixing of the dispersion,
wherein formation of the monomolecular thin layer is followed by mixing of additional particles into the dispersion, these having an essentially monomolecular thin layer, such that the chemical reaction for coupling of the particles takes place between the thin layers.

7. The method as claimed in claim 1, wherein the particles comprise aluminum oxide.

8. The method as claimed in claim 2, wherein the functionalizing agent is a polymer.

9. The method as claimed in claim 8, wherein the polymer is a thermoplastic.

10. The method as claimed in claim 8, wherein the polymer is:
a polyolefin alcohol, or
an incompletely hydrolyzed polyvinyl alcohol having a molecular mass between 1000 and 4000, or
a polyalkylsiloxane, or
a silicone polyester.

11. The method as claimed in claim 10, wherein the polyolefin alcohol is polyethylene glycol.

12. The method as claimed in claim 10, wherein the polyalkylsiloxane is methoxy-terminated polydimethylsiloxane.

13. The method as claimed in claim 2,
wherein the functionalizing agent is an alkoxysilane,
wherein the alkoxysilane has epoxy groups, or amino groups.

14. The method as claimed in claim 13, wherein the epoxy groups include 3-glycidoxypropyltrimethoxysilane.

15. The method as claimed in claim 13, wherein the amino groups include 3-aminopropyltrimethoxysilane.

16. The method as claimed in claim 1,
wherein the functionalizing agent comprises nanoparticles.

17. The method as claimed in claim 16, wherein the nanoparticles comprise nanoparticles of silicon oxide with surface epoxide groups.

18. The method as claimed in claim 1, wherein the energy to overcome the activation energy is supplied in the form of heat and/or radiation.

19. The method as claimed in claim 1, wherein the removal of the carrier fluid from the sediment is accomplished by filtration and subsequent supply of heat.

20. The method as claimed in claim 1, wherein the carrier fluid is water.

* * * * *